United States Patent
Ogura

(10) Patent No.: US 7,914,876 B2
(45) Date of Patent: Mar. 29, 2011

(54) HONEYCOMB STRUCTURE

(75) Inventor: Yutaka Ogura, Inazawa (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 12/542,299

(22) Filed: Aug. 17, 2009

(65) Prior Publication Data

US 2009/0304988 A1    Dec. 10, 2009

Related U.S. Application Data

(63) Continuation of application No. PCT/JP2007/073945, filed on Dec. 12, 2007.

(30) Foreign Application Priority Data

Mar. 20, 2007   (JP) ................... 2007-072688

(51) Int. Cl.
| | |
|---|---|
| B32B 3/12 | (2006.01) |
| B01D 39/06 | (2006.01) |
| B01D 59/00 | (2006.01) |
| B01D 51/00 | (2006.01) |

(52) U.S. Cl. ............ 428/116; 428/117; 55/523; 55/488; 55/419

(58) Field of Classification Search .................. None
See application file for complete search history.

(56) References Cited

U.S. PATENT DOCUMENTS

| | | | |
|---|---|---|---|
| 2004/0128991 A1* | 7/2004 | Sakamoto | ................... 60/299 |
| 2005/0016140 A1 | 1/2005 | Komori et al. | |
| 2008/0086993 A1 | 4/2008 | Komori et al. | |

FOREIGN PATENT DOCUMENTS

| | | |
|---|---|---|
| DE | 10 2004 026 060 A1 | 12/2005 |
| JP | A-11-169640 | 6/1999 |
| JP | A-2000-279729 | 10/2000 |
| WO | WO 2004/024295 A1 | 3/2004 |

OTHER PUBLICATIONS

May 19, 2010 Extended European Search Report issued in EP 07 85 0496.

* cited by examiner

*Primary Examiner* — Gordon R Baldwin
(74) *Attorney, Agent, or Firm* — Oliff & Berridge, PLC

(57) ABSTRACT

A honeycomb structure has a plurality of honeycomb segments each including porous partition walls that define a plurality of cells communicating with two end surfaces and an outer wall that surrounds the partition walls. The honeycomb segments are combined in a direction perpendicular to the axial directions of the honeycomb segments, and the outer walls of the honeycomb segments are integrally joined by a joint material. The outer wall of each honeycomb segment has corners. A cell in contact with the inner surface of a portion of the outer wall having one of the corners is defined by a plurality of sides including two sides formed by the inner surface and two sides each having one end in contact with the inner surface. An angle θa of the corner formed by the two sides each having the one end in contact with the inner surface is 100 to 150°.

8 Claims, 2 Drawing Sheets

HONEYCOMB STRUCTURE

This is a Continuation of International Application No. PCT/W2007/073945 filed Dec. 12, 2007, which claims the benefit of Japanese Patent Application No. 2007-072688 filed Mar. 20, 2007. The disclosure of the prior applications is hereby incorporated by reference herein in its entirety.

TECHNICAL FIELD

The present invention relates to a honeycomb structure preferably used in a dust collecting filter such as a diesel particulate filter.

BACKGROUND ART

A honeycomb structure is broadly used as a filter for collecting dust from an exhaust gas, for example, a diesel particulate filter (DPF) for collecting and removing a particulate material (particulates) such as soot included in an exhaust gas from a diesel engine or the like.

The honeycomb structure used for such a purpose has a problem that the structure is exposed to the immediate temperature change of the exhaust gas or local heat generation, a non-uniform temperature distribution is easily generated in the structure, and cracks are generated owing to the distribution. To solve such a problem, a method is suggested in which the honeycomb structure is constituted of a plurality of honeycomb segments, and the honeycomb segments are integrally joined by a joint material made of an elastic material, whereby a thermal stress exerted to the honeycomb structure is alleviated (e.g., see Patent Document 1).

In general, the temperature distribution of the honeycomb structure used in the DPF becomes the most non-uniform state during the regeneration of the filter, that is, during the performing of a treatment for heating the honeycomb structure and burning and removing the soot to return, to an initial state, a pressure loss raised by the soot deposited in the honeycomb structure with an elapse of time. However, during this regeneration, the thermal stress cannot sufficiently be alleviated even in the honeycomb structure employing the above constitution, whereby not a few cracks (especially annular cracks in the diametric direction of the honeycomb structure) are generated, and the generated cracks are further developed. Patent Document 1: JP-A-2000-279729

DISCLOSURE OF THE INVENTION

The present invention has been developed in view of a conventional situation, and an object thereof is to provide a honeycomb structure having a constitution in which a plurality of honeycomb segments are integrally joined, whereby local stress concentration can be alleviated to prevent cracks from being generated or developed even in a case where the internal temperature distribution of the honeycomb structure used in a DPF becomes non-uniform as in the regeneration of the structure.

To achieve the above object, according to the present invention, the following honeycomb structure is provided.

[1] A honeycomb structure having a plurality of honeycomb segments each including porous partition walls that define a plurality of cells communicating with two end surfaces and an outer wall that surrounds the partition walls, the honeycomb segments being combined in a direction perpendicular to the axial directions of the honeycomb segments, the outer walls of the honeycomb segments being integrally joined by a joint material, wherein the outer wall of each honeycomb segment has corners, a cell in contact with the inner surface of a portion of the outer wall having one of the corners is defined by a plurality of sides including two sides formed by the inner surface and two sides each having one end in contact with the inner surface, and an angle $\theta_a$ of the corner formed by the two sides each having the one end in contact with the inner surface is 100 to 150°.

[2] The honeycomb structure according to [1], wherein an angle $\theta_b$ Of the corner formed by the two sides formed by the inner surface is 100 to 150°.

[3] The honeycomb structure according to [1] or [2], wherein one of the two end surfaces is provided with a plugging portion that plugs one end of each of the cells.

[4] The honeycomb structure according to any one of [1] to [3], wherein two types of cells having different open areas are alternately arranged.

According to the present invention, even in a case where the internal temperature distribution of the honeycomb structure used in the DPF becomes non-uniform, for example, during the regeneration of the structure, the local stress concentration on the corners of the honeycomb segments can be prevented from being caused, and the generation or development of cracks can be suppressed.

DESCRIPTION OF REFERENCE NUMERALS

1: honeycomb structure, 2: cell, 2': cell, 2a: cell, 2b: cell, 3: honeycomb segment, 4: partition wall, 5: joint material, 6a: side, 6b: side, 6c: side, 6d: side, 7: outer wall and 8: corner.

BEST MODE FOR CARRYING OUT THE INVENTION

Hereinafter, the present invention will be described with respect to a specific embodiment, but the present invention is not limited to this embodiment when interpreted, and the present invention can variously be altered, modified or improved based on the knowledge of a person with ordinary skill without departing from the scope of the present invention.

Figure 1:
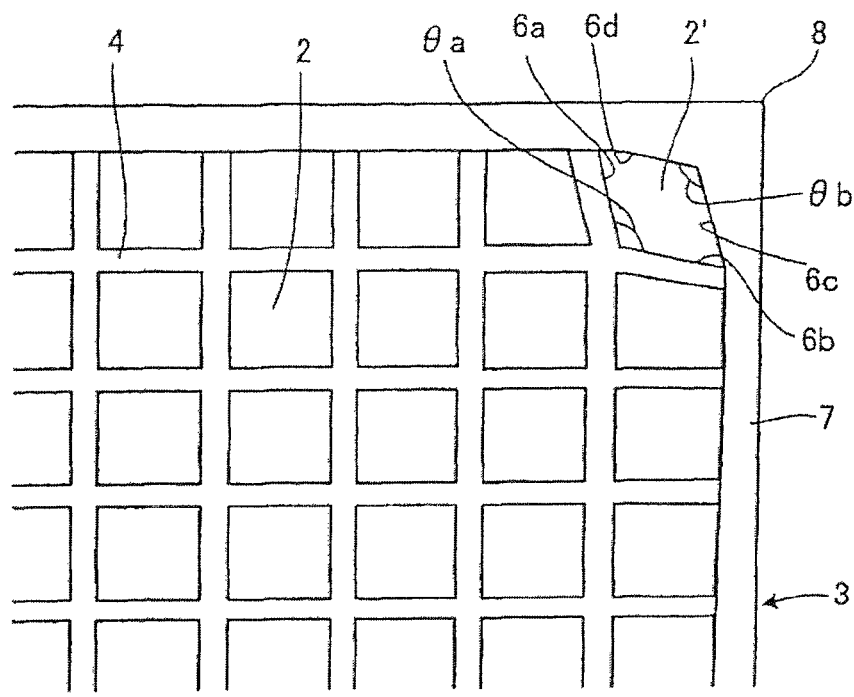
FIG. 1 is a partially enlarged plan view of one end surface of a honeycomb segment, showing one example of the honeycomb segment as a constituent element of a honeycomb structure of the present invention.

FIG. 1 is a partially enlarged plan view of one end surface of a honeycomb segment, showing one example of the honeycomb segment as a constituent element of a honeycomb structure of the present invention. A honeycomb segment 3 as the constituent element of the honeycomb structure of the present invention includes porous partition walls 4 that define a plurality of cells 2 communicating with two end surfaces of the honeycomb segment, and an outer wall 7 that surrounds the partition walls 4, and the section of the honeycomb segment perpendicular to the axial direction of the segment has such a shape that the outer wall 7 has corners 8, for example, a square shape or a rectangular shape.

Moreover, a cell 2′ in contact with the inner surface of a portion of this outer wall 7 having the corner 8 is defined by a plurality of sides including two sides 6c and 6d formed by the inner surface and two sides 6a and 6b each having one end in contact with the inner surface, and an angle $\theta_a$ of the corner formed by the two sides 6a and 6b each having the one end in contact with the inner surface is 100 to 150°, preferably 115 to 150°, more preferably 140 to 150°.

In a case where the honeycomb structure including a plurality of integrally joined honeycomb segments is used in a DPF, a high thermal stress generated during filter regeneration easily concentrates on the corners of the honeycomb segments, and it is often the case that the corners become the start points of cracks generated by the thermal stress. To solve the problem, in the honeycomb structure of the present invention, among sides that define the cell 2′ in contact with the inner surface of the portion of the outer wall 7 having the corner 8 as described above, the angle $\theta_a$ of the corner formed by the two sides 6a and 6b each having one end in contact with the inner surface is set to an obtuse angle in a predetermined range to alleviate the concentration of the stress on the corner 8, whereby the generation or development of the crack from the corner 8 as the start point is suppressed.

It is to be noted that in a case where $\theta_a$ is less than 100°, even when the angle is the obtuse angle, the concentration of the stress on the corner 8 cannot sufficiently be alleviated, and an effect of suppressing the generation or development of the crack becomes insufficient. Moreover, when $\theta_a$ exceeds 150°, there is unfavorably concern that the open area of the cell 2′ might decrease to increase a pressure loss.

Moreover, according to the present invention, in the cell 2′ that is in contact with the inner surface of the portion of the outer wall 7 having the corner 8 and that is defined by a plurality of sides including the two sides 6c and 6d formed by the inner surface and the two sides 6a and 6b each having the one end in contact with the inner surface, an angle $\theta_b$ of the corner formed by the two sides 6c and 6d formed by the inner surface is preferably 100 to 150°, more preferably 115 to 150°, further preferably 140 to 150°.

In addition to $\theta_a$, $\theta_b$ is set to an obtuse angle in such a range, whereby the concentration of the stress on the corner 8 can further be alleviated, and a thermal shock resistance further improves. It is to be noted that when $\theta_b$ is less than 100°, an effect of promoting the alleviation of the concentration of the stress on the corner is small. On the other hand, when $\theta_b$ exceeds 150°, there is unfavorably concern that the open area of the cell 2′ might decrease to increase the pressure loss.

Figure 3:
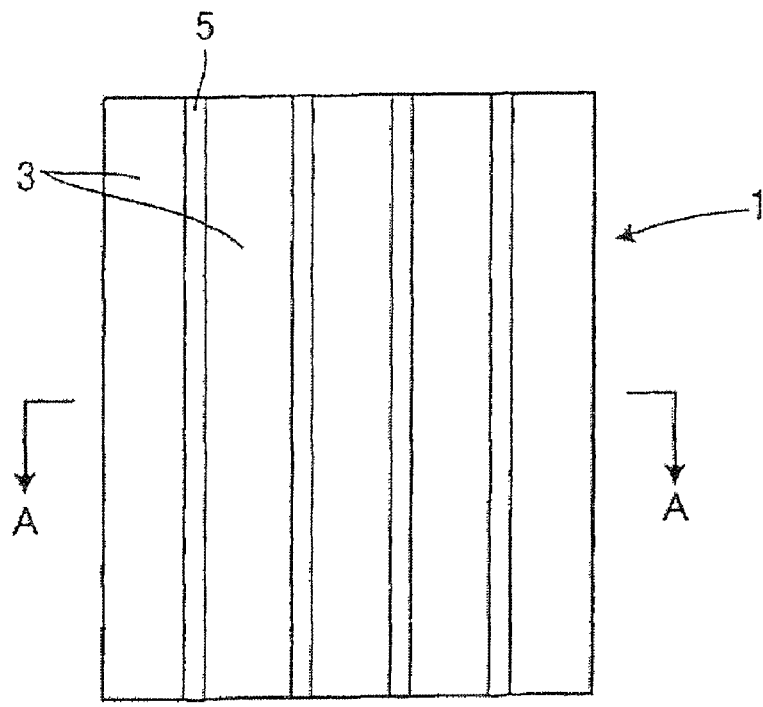
FIG. 3 is a side view showing one example of an embodiment of the honeycomb structure of the present invention.
Figure 4:
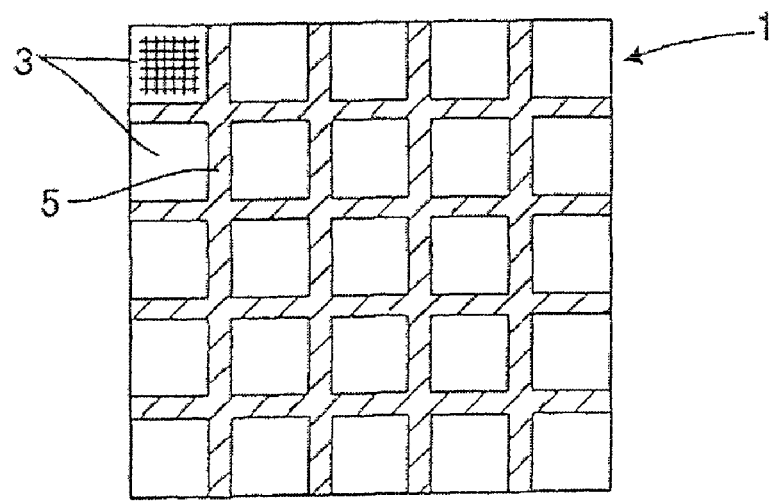
FIG. 4 is a sectional view cut along the A-A line of FIG. 3.

FIG. 3 is a side view showing one example of the embodiment of the honeycomb structure of the present invention, and FIG. 4 is a sectional view cut along the A-A line of the side view. As shown in these drawings, a honeycomb structure 1 of the present invention is integrated by combining a plurality of honeycomb segments 3 having the above structure in a direction perpendicular to the axial directions of the segments and joining the outer walls of the segments to one another by a joint material 5. In the present example, the honeycomb segments 3 having a square sectional shape are combined and joined to obtain the honeycomb structure 1 having a square pole shape, but the outer peripheral portion of the joined segments may be ground to process the structure into a desired shape such as a columnar shape. It is to be noted that in this case, the processing exposes internal partition walls and cells, and hence an exposed surface is preferably coated with a coating material or the like to form an outer peripheral wall.

When the honeycomb structure of the present invention is used as a dust collecting filter such as a DPF, one of two end surfaces of each honeycomb segment is preferably provided with plugging portions that plug one end of each cell. The adjacent cells are usually alternately plugged so that one end surface and the other end surface of the honeycomb segment have complementary checked patterns.

When a fluid including particulates of soot and the like is passed from one end surface of the honeycomb structure constituted of the honeycomb segments plugged in this manner, the fluid flows into the honeycomb structure from the cells whose ends are not plugged on the side of the one end surface of the structure, and passes through porous partition walls having a filter ability to enter another through channel that is not plugged on the side of the other end surface of the honeycomb structure. Moreover, when the fluid passes through the partition walls, the particulates in the fluid are collected by the partition walls, and the fluid purified by removing the particulates therefrom is discharged from the other end surface of the honeycomb structure.

Figure 2:
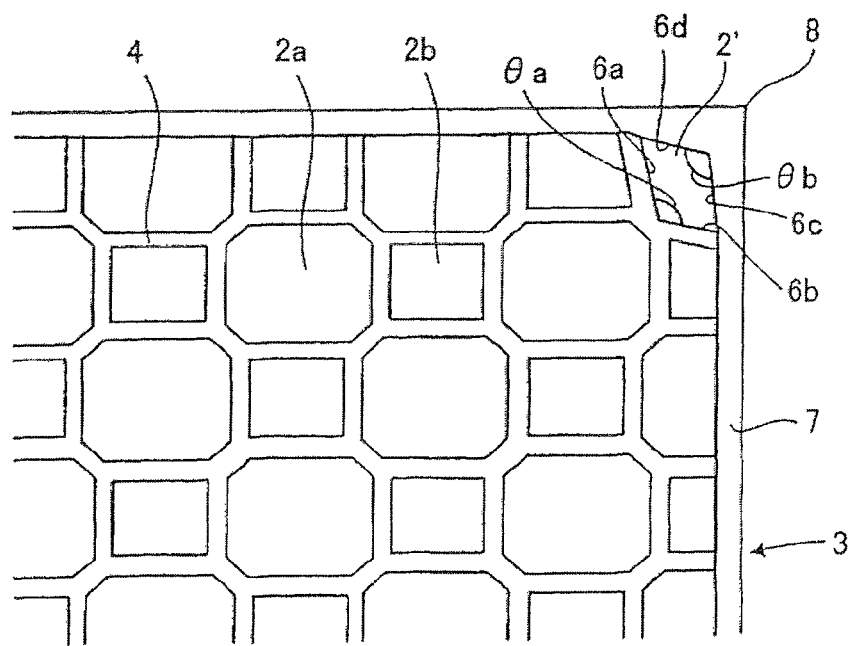
FIG. 2 is a partially enlarged plan view of one end surface of a honeycomb segment, showing another example of the honeycomb segment as the constituent element of the honeycomb structure of the present invention.

Cells defined by partition walls may be the cells 2 having the same shape and an equal open area as shown in FIG. 1, but FIG. 2 shows one of preferable configurations. In the configuration, two types of cells 2a and 2b having different open areas are alternately arranged.

Heretofore, in the honeycomb structure used in the DPF or the like, all the cells have the same shape (usually, a quadrangular shape) and the equal open area, and are alternately plugged so that the inlet and outlet side surfaces of the cells have a checkered pattern. Therefore, the inlet and outlet side end surfaces of the structure generally have an equal open area ratio. However, in recent years, a honeycomb structure has been suggested in which the open area ratio of the inlet end surface of the structure is larger than that of the outlet end surface thereof for a purpose of the suppressing of the increase of the pressure loss after the collection of the soot or the like.

The open area ratio of the inlet side end surface of the honeycomb structure is different from that of the outlet side end surface thereof. Such a honeycomb structure can be obtained by, for example, alternately arranging two types of cells 2a and 2b having different open areas, plugging the cells 2b having smaller open areas in one end surface (the inlet side end surface) of the structure, and plugging the cells 2a having larger open areas in the other end surface (the outlet side end surface) as shown in FIG. 2.

From the viewpoints of strength and thermal resistance, a constituent material of the honeycomb segments used in the honeycomb structure of the present invention is preferably at least one material selected from the group consisting of silicon carbide (SiC), a silicon-silicon carbide based composite material formed by using silicon carbide (SiC) as an aggregate and silicon (Si) as a bonding material, silicon nitride, cordierite, mullite, alumina, spinel, a silicon carbide-cordierite based composite material, lithium aluminum silicate, aluminum titanate and an Fe—Cr—Al based metal. Above all, silicon carbide (SiC) or the silicon-silicon carbide based composite material is preferable. Furthermore, as a constituent material of plugging portions, the same material as that of the honeycomb segments is preferably used in order to decrease a thermal expansion difference between the plugging portions and the honeycomb segments.

As a manufacturing method of the honeycomb segments, a heretofore known method may be used. As one specific example of the method, a binder such as methyl cellulose, hydroxypropoxyl cellulose, hydroxyethyl cellulose, carboxymethyl cellulose or polyvinyl alcohol, a pore former, a surfactant, water as a solvent and the like are added to the above material to obtain a kneaded clay having plasticity, and the clay is extruded into a predetermined honeycomb shape, dried by microwaves, hot air or the like, and fired. When the plugging portions are formed in the cells, the firing may be performed before forming the plugging portions in the cells, or the firing may be performed together with the firing of the plugging portions after forming the plugging portions in the cells.

As a method for plugging the cells, a heretofore known method may be used. As one specific example of the method, a sheet is attached to the end surface of the honeycomb segment, and holes are made in positions of the sheet corresponding to the cells to be plugged. While this sheet is attached, the end surfaces of the honeycomb segments are immersed into a plugging slurry as a slurried constituent material of the plugging portions, and the plugging slurry is charged into the opening ends of the cells to be plugged through the holes made in the sheet, followed by drying and/or firing, to harden the slurry.

The thicknesses of the partition walls of the honeycomb segments are preferably 50 to 2000 μm. When the thicknesses of the partition walls are less than 50 μm, the honeycomb segments run short of strength on occasion. When the thicknesses exceed 2000 μm, the valid GSA of the honeycomb segments lowers, and a pressure loss during the flowing of the gas increases.

The cell densities of the honeycomb segments are preferably 6 to 2000 cells/square inch (0.9 to 310 cells/cm$^2$). When the cell densities are less than 6 cells/square inch (0.9 cell/cm$^2$), the honeycomb segments run short of the strength and valid geometric surface area (GSA) on occasion. When the cell densities exceed 2000 cells/square inch (310 cells/cm$^2$), the pressure loss during the flowing of the gas increases.

To join the honeycomb segments, a joint agent composition of pasted joint material components is used. By repeating steps of coating the outer wall surface of the honeycomb segment with the joint material composition so as to have a desired thickness and disposing another honeycomb segment, a laminate article of the honeycomb segments is prepared, and the whole article is joined by appropriately applying an external pressure to the article. Then, the joint material composition is dried and hardened.

To obtain the joint agent composition, a filler made of a ceramic fiber, ceramic particles or the like having a thermal resistance, and an inorganic adhesive such as colloidal silica are used as main components. Furthermore, if necessary, an organic binder (e.g., methyl cellulose (MC), carboxymethyl cellulose (CMC) or the like), a dispersant, water and the like are added to the main components, and mixed, kneaded and pasted by using a kneader such as a mixer.

EXAMPLES

Hereinafter, the present invention will be described in more details based on examples, but the present invention is not limited to these examples.

Preparation of Honeycomb Segments

SiC powder and metal Si powder were mixed at a mass ratio of 75:25, and methyl cellulose, hydroxypropoxyl methyl cellulose, a surfactant and water were added to and kneaded with this resultant mixture, to obtain a kneaded clay having plasticity. This clay was extruded and dried to obtain a formed honeycomb segment article having partition wall thicknesses of 12 mil (300 μm), a cell density of about 47 cells/cm$^2$ (300 cells/square inch), a quadrangular cell shape, a square sectional shape with one side of 36 mm in a direction perpendicular to an axial direction, a length of 152 mm, and angles $\theta_a$ and $\theta_b$ shown in FIG. 1 and Tables 1 to 4. The ends of the cells of this formed honeycomb segment article were plugged so that the end surfaces of the article had checkered patterns. That is, the cells were plugged so as to close the ends of the adjacent cells on opposite sides. As a plugging charge material, a material similar to that of the honeycomb segments was used. Thus, the ends of the cells were plugged and dried, followed by degreasing in an N$_2$ atmosphere at about 400° C. and firing in an Ar inactive atmosphere at about 1550° C. In consequence, porous honeycomb segments made of a silicon-silicon carbide based composite material were obtained.

Preparation of Joint Material Composition

An aluminosilicate fiber as an inorganic fiber, colloidal silica and clay as inorganic binders, and inorganic particles of SiC were mixed, and water, an organic binder (CMC, PVA), resin balloon and a dispersant were further added to the resultant mixture, and kneaded by a mixer for 30 minutes, thereby obtaining a pasted joint material.

Preparation of Honeycomb Structure

By repeating a step of coating the outer wall surface of the honeycomb segment with a joint material composition to form a joint material layer having a thickness of about 1 mm, and disposing another honeycomb segment on the joint material layer, a laminated honeycomb segment article constituted of 16 honeycomb segments in total as a combination of four vertical segments×four lateral segments was prepared. A pressure or the like was appropriately applied from the outside to the article to join the whole article, and then the article was dried at 140° C. for two hours to obtain a joined honeycomb segment article. The outer periphery of the resultant joined honeycomb segment article was ground into a columnar shape, and the outer peripheral surface of the article was coated with a coating material having the same composition as the joint material composition to form the outer peripheral wall of the article, followed by drying and hardening at 700° C. for two hours. In consequence, honeycomb structures of Examples 1 to 22 and Comparative Examples 1 to 4 were obtained.

Evaluation of Honeycomb Structure

A ceramic non-expansible mat as a holding material was wound around the outer peripheries of the honeycomb structures of Examples 1 to 22 and Comparative Examples 1 to 4 obtained as described above, and each structure was pushed into a canning can member made of SUS409 to obtain the canned structure. Afterward, a combustion gas including soot generated by burning diesel fuel light oil was caused to flow into the honeycomb structure from one end surface thereof, and discharged from the other end surface thereof, whereby the soot was deposited in a range of 4 to 16 g/L in the honeycomb structure. The honeycomb structure was once left to stand and cooled to room temperature, and the burning gas including a constant ratio of oxygen was caused to flow into the honeycomb structure from one end surface thereof at 680° C. When the pressure loss of the honeycomb structure decreased, the flow rate of the burning gas was decreased to immediately burn the soot. Thus, a regeneration limit test was conducted. Three honeycomb structures were subjected to this regeneration limit test for each example or each comparative example. As shown in Tables 1 to 4, the amount of the deposited soot was evaluated as "a circle", when the generation of a crack was not recognized after the test. When the generation of the crack was recognized, the amount was evaluated as "a cross". The results are shown in Tables 1 to 4.

TABLE 1

| | | Comparative example 1 | | | Comparative example 2 | | | Example 1 | | | Example 2 | | | Example 3 | | | Example 4 | | | Example 5 | | |
|---|---|---|---|---|---|---|---|---|---|---|---|---|---|---|---|---|---|---|---|---|---|---|
| | | Angle θ_a | | | | | | | | | | | | | | | | | | | | |
| | | 90° | | | 95° | | | 100° | | | 105° | | | 110° | | | 115° | | | 120° | | |
| | | Angle θ_b | | | | | | | | | | | | | | | | | | | | |
| | | 90° | | | 90° | | | 90° | | | 90° | | | 90° | | | 90° | | | 90° | | |
| | | Honeycomb structure No. | | | | | | | | | | | | | | | | | | | | |
| | | A1 | A2 | A3 | B1 | B2 | B3 | C1 | C2 | C3 | D1 | D2 | D3 | E1 | E2 | E3 | F1 | F2 | F3 | G1 | G2 | G3 |
| Amount of deposited soot | 4 g/L | ○ | ○ | ○ | ○ | ○ | ○ | ○ | ○ | ○ | ○ | ○ | ○ | ○ | ○ | ○ | ○ | ○ | ○ | ○ | ○ | ○ |
| | 5 g/L | x | ○ | x | ○ | x | ○ | ○ | ○ | ○ | ○ | ○ | ○ | ○ | ○ | ○ | ○ | ○ | ○ | ○ | ○ | ○ |
| | 6 g/L | | x | | x | | ○ | ○ | ○ | ○ | ○ | ○ | ○ | ○ | ○ | ○ | ○ | ○ | ○ | ○ | ○ | ○ |
| | 7 g/L | | | | | | x | x | ○ | ○ | x | ○ | ○ | ○ | ○ | ○ | ○ | ○ | ○ | ○ | ○ | ○ |
| | 8 g/L | | | | | | | | ○ | x | | ○ | ○ | x | ○ | ○ | ○ | ○ | ○ | ○ | x | ○ |
| | 9 g/L | | | | | | | | x | | | x | x | | ○ | x | x | x | x | ○ | | ○ |
| | 10 g/L | | | | | | | | | | | | | | x | | | | | x | | x |
| | 11 g/L | | | | | | | | | | | | | | | | | | | | | |
| | 12 g/L | | | | | | | | | | | | | | | | | | | | | |
| | 13 g/L | | | | | | | | | | | | | | | | | | | | | |
| | 14 g/L | | | | | | | | | | | | | | | | | | | | | |

TABLE 2

| | | Example 6 | | | Example 7 | | | Example 8 | | | Example 9 | | | Example 10 | | | Example 11 | | |
|---|---|---|---|---|---|---|---|---|---|---|---|---|---|---|---|---|---|---|---|
| | | Angle θ_a | | | | | | | | | | | | | | | | | | |
| | | 125° | | | 130° | | | 135° | | | 140° | | | 145° | | | 150° | | |
| | | Angle θ_b | | | | | | | | | | | | | | | | | | |
| | | 90° | | | 90° | | | 90° | | | 90° | | | 90° | | | 90° | | |
| | | Honeycomb structure No. | | | | | | | | | | | | | | | | | | |
| | | H1 | H2 | H3 | I1 | I2 | I3 | J1 | J2 | J3 | K1 | K2 | K3 | L1 | L2 | L3 | M1 | M2 | M3 |
| Amount of deposited soot | 4 g/L | ○ | ○ | ○ | ○ | ○ | ○ | ○ | ○ | ○ | ○ | ○ | ○ | ○ | ○ | ○ | ○ | ○ | ○ |
| | 5 g/L | ○ | ○ | ○ | ○ | ○ | ○ | ○ | ○ | ○ | ○ | ○ | ○ | ○ | ○ | ○ | ○ | ○ | ○ |
| | 6 g/L | ○ | ○ | ○ | ○ | ○ | ○ | ○ | ○ | ○ | ○ | ○ | ○ | ○ | ○ | ○ | ○ | ○ | ○ |
| | 7 g/L | ○ | ○ | ○ | ○ | ○ | ○ | ○ | ○ | ○ | ○ | ○ | ○ | ○ | ○ | ○ | ○ | ○ | ○ |
| | 8 g/L | ○ | ○ | ○ | ○ | ○ | ○ | ○ | ○ | ○ | ○ | ○ | ○ | ○ | ○ | ○ | ○ | ○ | ○ |
| | 9 g/L | ○ | ○ | x | ○ | ○ | ○ | ○ | ○ | ○ | ○ | ○ | ○ | ○ | ○ | ○ | ○ | ○ | ○ |
| | 10 g/L | ○ | ○ | | ○ | ○ | ○ | ○ | ○ | ○ | ○ | ○ | ○ | ○ | ○ | ○ | ○ | ○ | ○ |
| | 11 g/L | x | ○ | | ○ | x | x | ○ | x | x | ○ | ○ | ○ | ○ | ○ | ○ | ○ | ○ | ○ |
| | 12 g/L | | x | | x | | | ○ | | | x | x | ○ | ○ | x | ○ | ○ | ○ | ○ |
| | 13 g/L | | | | | | | x | | | | ○ | x | ○ | | x | x | ○ | ○ |
| | 14 g/L | | | | | | | | | | | x | | | | | | x | x |

TABLE 3

| | | Comparative example 3 | | | Comparative example 4 | | | Example 12 | | | Example 13 | | | Example 14 | | | Example 15 | | | Example 16 | | |
|---|---|---|---|---|---|---|---|---|---|---|---|---|---|---|---|---|---|---|---|---|---|---|
| | | Angle θ_a | | | | | | | | | | | | | | | | | | | | | |
| | | 90° | | | 95° | | | 100° | | | 105° | | | 110° | | | 115° | | | 120° | | |
| | | Angle θ_b | | | | | | | | | | | | | | | | | | | | | |
| | | 90° | | | 95° | | | 100° | | | 105° | | | 110° | | | 115° | | | 120° | | |
| | | Honeycomb structure No. | | | | | | | | | | | | | | | | | | | | | |
| | | N1 | N2 | N3 | O1 | O2 | O3 | P1 | P2 | P3 | Q1 | Q2 | Q3 | R1 | R2 | R3 | S1 | S2 | S3 | T1 | T2 | T3 |
| Amount of deposited soot | 4 g/L | ○ | ○ | ○ | ○ | ○ | ○ | ○ | ○ | ○ | ○ | ○ | ○ | ○ | ○ | ○ | ○ | ○ | ○ | ○ | ○ | ○ |
| | 5 g/L | x | ○ | x | ○ | x | ○ | ○ | ○ | ○ | ○ | ○ | ○ | ○ | ○ | ○ | ○ | ○ | ○ | ○ | ○ | ○ |
| | 6 g/L | | x | | x | | ○ | ○ | ○ | ○ | ○ | ○ | ○ | ○ | ○ | ○ | ○ | ○ | ○ | ○ | ○ | ○ |
| | 7 g/L | | | | | | x | x | ○ | ○ | ○ | ○ | ○ | ○ | ○ | ○ | ○ | ○ | ○ | ○ | ○ | ○ |
| | 8 g/L | | | | | | | | ○ | ○ | x | ○ | ○ | x | ○ | ○ | ○ | ○ | ○ | ○ | ○ | ○ |
| | 9 g/L | | | | | | | | x | x | | x | x | | ○ | ○ | ○ | ○ | ○ | ○ | ○ | ○ |
| | 10 g/L | | | | | | | | | | | | | | x | ○ | x | x | x | ○ | ○ | ○ |

TABLE 3-continued

| | Comparative example 3 | Comparative example 4 | Example 12 | Example 13 | Example 14 | Example 15 | Example 16 |
|---|---|---|---|---|---|---|---|
| Angle $\theta_a$ | 90° | 95° | 100° | 105° | 110° | 115° | 120° |
| Angle $\theta_b$ | 90° | 95° | 100° | 105° | 110° | 115° | 120° |

| Honeycomb structure No. | N1 | N2 | N3 | O1 | O2 | O3 | P1 | P2 | P3 | Q1 | Q2 | Q3 | R1 | R2 | R3 | S1 | S2 | S3 | T1 | T2 | T3 |
|---|---|---|---|---|---|---|---|---|---|---|---|---|---|---|---|---|---|---|---|---|---|
| 11 g/L | | | | | | | | | | | | | | x | | x | | | | o | x |
| 12 g/L | | | | | | | | | | | | | | | | | | | | o | |
| 13 g/L | | | | | | | | | | | | | | | | | | | | x | |
| 14 g/L | | | | | | | | | | | | | | | | | | | | | |
| 15 g/L | | | | | | | | | | | | | | | | | | | | | |
| 16 g/L | | | | | | | | | | | | | | | | | | | | | |

TABLE 4

| | Example 17 | Example 18 | Example 19 | Example 20 | Example 21 | Example 22 |
|---|---|---|---|---|---|---|
| Angle $\theta_a$ | 125° | 130° | 135° | 140° | 145° | 150° |
| Angle $\theta_b$ | 125° | 130° | 135° | 140° | 145° | 150° |

| | | Honeycomb structure No. | | | | | | | | | | | | | | | | | |
|---|---|---|---|---|---|---|---|---|---|---|---|---|---|---|---|---|---|---|---|
| | | U1 | U2 | U3 | V1 | V2 | V3 | W1 | W2 | W3 | X1 | X2 | X3 | Y1 | Y2 | Y3 | Z1 | Z2 | Z3 |
| Amount of deposited soot | 4 g/L | o | o | o | o | o | o | o | o | o | o | o | o | o | o | o | o | o | o |
| | 5 g/L | o | o | o | o | o | o | o | o | o | o | o | o | o | o | o | o | o | o |
| | 6 g/L | o | o | o | o | o | o | o | o | o | o | o | o | o | o | o | o | o | o |
| | 7 g/L | o | o | o | o | o | o | o | o | o | o | o | o | o | o | o | o | o | o |
| | 8 g/L | o | o | o | o | o | o | o | o | o | o | o | o | o | o | o | o | o | o |
| | 9 g/L | o | o | o | o | o | o | o | o | o | o | o | o | o | o | o | o | o | o |
| | 10 g/L | o | o | o | o | o | o | o | o | o | o | o | o | o | o | o | o | o | o |
| | 11 g/L | o | o | x | o | o | o | o | x | o | o | o | o | o | o | o | o | o | o |
| | 12 g/L | x | x | | x | x | x | o | | o | x | o | o | o | o | o | o | o | o |
| | 13 g/L | | | | | | | o | | | x | o | o | x | o | o | o | o | o |
| | 14 g/L | | | | | | | x | | | | o | x | o | | x | o | o | o |
| | 15 g/L | | | | | | | | | | | x | | x | | | o | x | x |
| | 16 g/L | | | | | | | | | | | | | | | | x | | |

Consideration

In Comparative Examples 1, 2 and Examples 1 to 11, $\theta_b$ was set to 90°, and $\theta_a$ was changed in a range of 90 to 150°. As compared with Comparative Examples 1 and 2 in which $\theta_a$ was less than 100°, Examples 1 to 11 having $\theta_a$ of 100 to 150° had a larger amount of the deposited soot at which the crack was generated in the regeneration limit test. In general, as the amount of the deposited soot increases, large heat is generated during regeneration, and a temperature difference between the inside and the outside of the honeycomb structure tends to increase. Therefore, with the increase of the amount of the deposited soot at which the crack was generated by the regeneration limit test, the thermal shock resistance is considered to be high.

In Comparative Examples 3, 4 and Examples 12 to 22, both $\theta_a$ and $\theta_b$ were changed in a range of 90 to 150°. As compared with Comparative Examples 3 and 4 in which $\theta_a$ and $\theta_b$ were less than 100°, Examples 12 to 22 having $\theta_a$ and $\theta_b$ of 100 to 150° had a larger amount of the deposited soot at which the crack was generated in the regeneration limit test, and indicated a high thermal resistance.

Moreover, Comparative Examples 1, 2 and Examples 1 to 11 are compared with Comparative Examples 3, 4 and Examples 12 to 22 when the angle $\theta_a$ is equal. As compared with a case where $\theta_b$ is fixed to 90°, in a case where $\theta_b$ and $\theta_a$ are both obtuse angles, the honeycomb structure has a larger amount of the deposited soot at which the crack is generated in the regeneration limit test, and indicates a high thermal resistance.

INDUSTRIAL APPLICABILITY

A honeycomb structure of the present invention can preferably be used as a dust collecting filter such as a DPF.

The invention claimed is:

1. A honeycomb structure having a plurality of honeycomb segments each including porous partition walls that define a plurality of cells communicating with two end surfaces and an outer wall that surrounds the partition walls, the honeycomb segments being combined in a direction perpendicular to axial directions of the honeycomb segments, the outer walls of the honeycomb segments being integrally joined by a joint material, wherein the outer wall of each honeycomb segment has corners, a cell in contact with an inner surface of a portion of the outer wall having one of the corners is defined by a plurality of sides including two sides formed by the inner surface and two sides each having one end in contact with the inner surface, at least one of the plurality of the honeycomb segments has a section that is perpendicular to the axial direction of the honeycomb segment and has a square shape or a rectangular shape and an angle $\theta_a$ of a corner formed by two sides of the square shape or rectangular shape each having one end in contact with the inner surface is 100° to 150°.

2. The honeycomb structure according to claim 1, wherein an angle $\theta_b$ of the corner formed by the two sides formed by the inner surface is 100 to 150°.

3. The honeycomb structure according to claim 1, wherein one of the two end surfaces is provided with a plugging portion that plugs one end of each of the cells.

4. The honeycomb structure according to claim 2, wherein two types of cells having different open areas are alternately arranged.

5. The honeycomb structure according to claim 2, wherein one of the two end surfaces is provided with a plugging portion that plugs one end of each of the cells.

6. The honeycomb structure according to claim 1, wherein two types of cells having different open areas are alternately arranged.

7. The honeycomb structure according to claim 3, wherein two types of cells having different open areas are alternately arranged.

8. The honeycomb structure according to claim 5, wherein two types of cells having different open areas are alternately arranged.

* * * * *